(12) United States Patent
Kim

(10) Patent No.: US 6,354,619 B1
(45) Date of Patent: Mar. 12, 2002

(54) PORTABLE AND COLLAPSIBLE CARTS

(76) Inventor: Jeong Ki Kim, 16 Haytown Rd., Lebanon, NJ (US) 08833

( * ) Notice: Subject to any disclaimer, the term of this patent is extended or adjusted under 35 U.S.C. 154(b) by 0 days.

(21) Appl. No.: 09/593,713

(22) Filed: Jun. 14, 2000

(51) Int. Cl.[7] ............................................. B62B 1/00
(52) U.S. Cl. ...................................... 280/651; 280/649
(58) Field of Search ................................. 280/651, 654, 280/47.34, 639, 87.05, 87.051, 642, 643, 644, 646, 42, 641, 649, 650

(56) References Cited

U.S. PATENT DOCUMENTS

| | | | |
|---|---|---|---|
| 250,205 A | 11/1881 | Collins | |
| 609,491 A | 8/1898 | Ashwell | |
| 2,020,766 A | 11/1935 | Brown | |
| 2,553,703 A | 5/1951 | Ebersole | |
| 2,574,610 A | 11/1951 | Aarestad | |
| 2,764,764 A | 10/1956 | Savage, Jr. | |
| 3,605,139 A | 9/1971 | Lorentz, Jr. | |
| 3,836,164 A | * 9/1974 | Sugino et al. | 280/42 X |
| 4,186,454 A | 2/1980 | Cone | |
| 4,202,065 A | 5/1980 | Sullivan | |
| 4,266,807 A | * 5/1981 | Griffin | 280/650 |
| 4,276,726 A | 7/1981 | Derus | |
| 4,542,916 A | * 9/1985 | Kassai | 280/642 |
| 4,599,832 A | 7/1986 | Benton et al. | |
| 4,739,527 A | 4/1988 | Kohus et al. | |
| 4,779,635 A | 10/1988 | Lynch | |
| 4,947,884 A | 8/1990 | Lynch | |
| 5,038,532 A | 8/1991 | Shahinpoor | |
| 5,288,098 A | * 2/1994 | Shamie | 280/642 |
| 5,290,050 A | 3/1994 | Kim | |
| 5,634,654 A | * 6/1997 | Lin | 280/649 |
| 5,685,552 A | * 11/1997 | Osaki | 280/646 X |
| 5,984,406 A | * 11/1999 | Lee | 297/42 |
| 6,179,374 B1 | * 1/2001 | Tang | 297/42 X |

* cited by examiner

*Primary Examiner*—Brian L. Johnson
*Assistant Examiner*—Bryan Fischmann
(74) *Attorney, Agent, or Firm*—Kaplan & Gilman, LLP (57) ABSTRACT

A collapsible and portable cart. The cart comprises a selectively collapsible frame for receiving therein a carry bag when the frame is in an open, usable position, at least one handle extending from the frame, a plurality of wheel assemblies and a floor array comprising a plurality of support bars and a weight bearing assembly located substantially centrally of the floor array. The weight bearing assembly of the floor array is comprises a top plate member and a plurality of downwardly extending support members, the support members being so situated as to create slots therebetween for receipt therein of one end of one of the support bars.

12 Claims, 8 Drawing Sheets

PORTABLE AND COLLAPSIBLE CARTS

BACKGROUND OF THE INVENTION

This invention relates to the field of carts, and more particularly, to a collapsible and portable cart for use in transporting and hauling a multitude of varied items.

Pushcarts are old in the art. In fact, the inventor of the subject invention is the inventor of an earlier cart, which cart received patent protection under U.S. Pat. No. 5,290,050, on Mar. 1, 1994. Before the '050 patent, there was U.S. Pat. No. 2,020,766 to Brown, issued on Nov. 12, 1935, for a collapsible basket. Applicant presumes there have been others.

Focusing on the above two pieces of prior art, a good example of the extremes in the collapsible cart industry is shown. While the invention of the '766 patent is directed to a cart for more industrial use, and is thereby built to accommodate both size and strength, the invention of the '050 patent is more particularly targeted to the individual/home user and to the tasks which are normally associated therewith (shopping, laundry, gardening, etc.).

As is seen in a more thorough review of the invention of the '766 patent, it is clearly built for strength. Not only are the sides of the cart of the '766 patent, constructed of a multitude of crossing bars 15, but the floor structure of the '766 patent (best seen in FIG. 5), has a multiple of support bars 16 and 34. As seen in FIGS. 5–8 of the '766 patent and described at column 3, line 42-column 4, line 2, the complicated and extensive structure of the floor of the '766 patent is extraordinarily complicated in design so as to allow for collapsibility of the cart, while maintaining the necessarily required strength parameters.

Turning to the subject inventor's earlier Handy Cart, patented in the '050 patent, we once again see an item which, while being designed for home/individual use, is nevertheless bulky and complicated in design and appearance; such bulk and complication lending the cart the nominal strength needed for the average, everyday chore (such as carrying home groceries from the Supermarket or small amount of laundry from the Laundromat). As seen in the '050 patent, a complicated structure of lazytongs frames and a multiple support bar floor is used to achieve both lateral and vertical strength and confinement for items held within the cart structure. It is in fact one of the disadvantages of the complex lazytongs frames of all four sides of the '050 patent, which in part contributes to the need for having eight support bars as a floor structure. As seen in the figures of the '050 patent, due to the complex lazytongs frames and the multiple intersection and crisscrossing of the individual frame bars 14, not only are corner lazytongs frame connections created at 30 (see FIG. 2), but intermediate side connections 32 are also created (see also FIG. 2). As anyone who has tried to open (expand) a gate made of similar multiple crossing lazytongs frames, these multiple crossing pieces are difficult to open, even for such a simple one directional gate-type apparatus. The '050 patent takes that earlier concept further, and creates a box structure, thereby requiring the simultaneous opening of four frames, in four separate directions. It is therefore a purpose of the flooring structure of the '050 patent, and the mutiple eight bar construction, to assist in opening the cart by applying downward pressure on the hub 34, thereby pushing outwardly on each of the eight support bars of the floor, and thereby also pushing on the corners 30 and intermediate connections 32 of the overall cart frame structure.

It would be desirable to have a portable and collapsible cart which has the strength of the cart of the '766 patent, while having a more ornamental and attractive look achieved by a less cumbersome wall and floor structure, which improved item could be used in both extremes of the portable cart industry; the industrial side of the industry as the '766 cart, and the home/individual side of the industry as is described and patented in the '050 cart.

SUMMARY OF THE INVENTION

In accordance with the invention, a collapsible and portable cart is provided. The cart comprises a selectively collapsible frame for receiving therein a carry bag when the frame is in an open, useable position, at least one handle extending from the frame, a plurality of wheel assemblies and a floor array comprised of a plurality of support bars and a weight bearing assembly located substantially centrally of the floor array. The weight bearing assembly of the floor array is comprised of a top plate member and a plurality of downwardly extending support members, the support members being so situated as to create slots therebetween for receipt therein of one end of one of the support bars.

Accordingly, it is an object of the invention to provide an improved collapsible and portable cart for home, commercial and industrial use.

Still another object of the invention is to provide an improved portable and collapsible cart which is aesthetically new and pleasing.

Still another object of the invention is to provide an improved collapsible and portable cart which is constructed using side and floor framing, while maintaining strength and durability, and while further allowing for ease of use.

Other objects of the invention will be in part be obvious and will in part be apparent from the following description.

The invention accordingly comprises assemblies possessing the features, properties and the relation of components which will be exemplified in the products hereinafter described, and the scope of the invention will be indicated in the claims.

BRIEF DESCRIPTION OF THE DRAWINGS

For a fuller understanding of the invention, reference is made to the following description, taken in connection with the accompanying drawings, in which.

DETAILED DESCRIPTION OF THE PREFERRED EMBODIMENTS

Referring first to the embodiment of the cart shown in FIGS. 1–4, a portable and collapsible cart is shown at 19.

Cart 10 has a four-sided collapsible frame 20, handles 30 and 40, wheel assemblies 50, and floor array 60.

Figure 1:
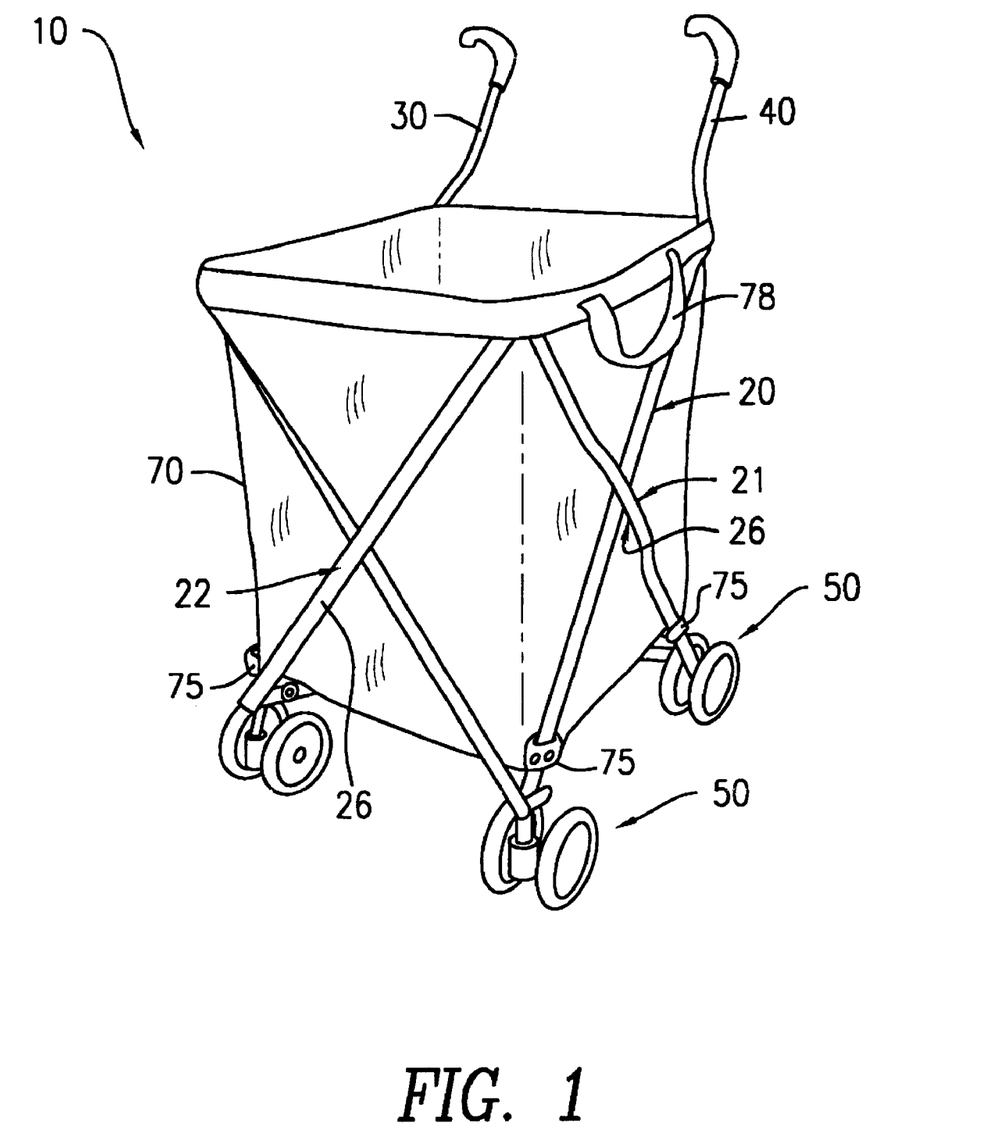
FIG. 1 is a perspective view of a first embodiment of the cart of the subject invention.
Figure 2:
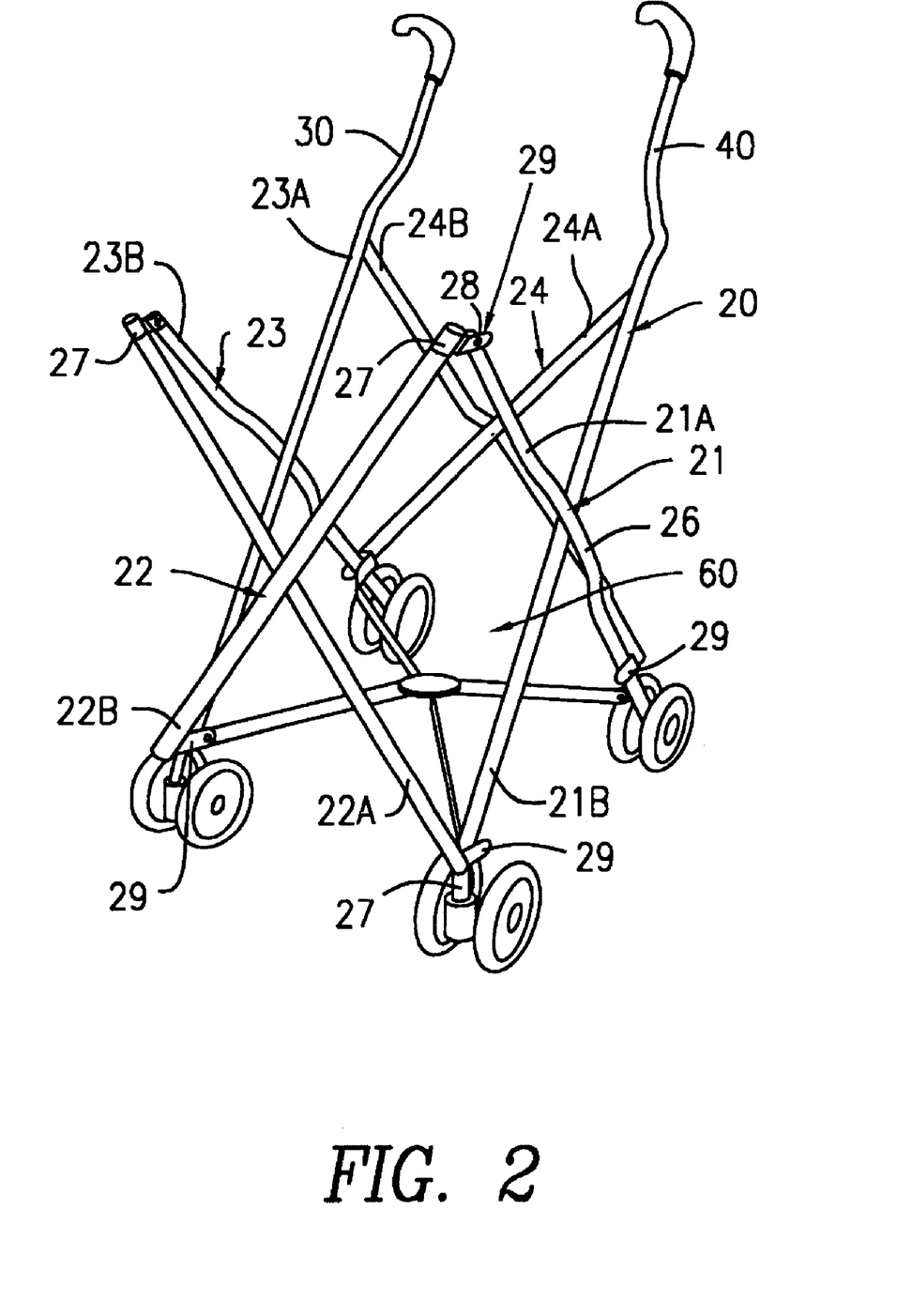
FIG. 2 is a perspective view of the cart of FIG. 1, without the interior carry bag.

As seen best in FIGS. 1 and 2, frame 20 is formed of four side frames 21, 22, 23 and 24. Each of side frames 21, 22, 23 and 24 is comprised of only two intersecting bars. Frame 21 has bars 21A and 21B, frame 22 has bars 22A and 22B, frame 23 has bars 23A and 23B, and frame 24 has bars 24A and 24B.

Figure 3:
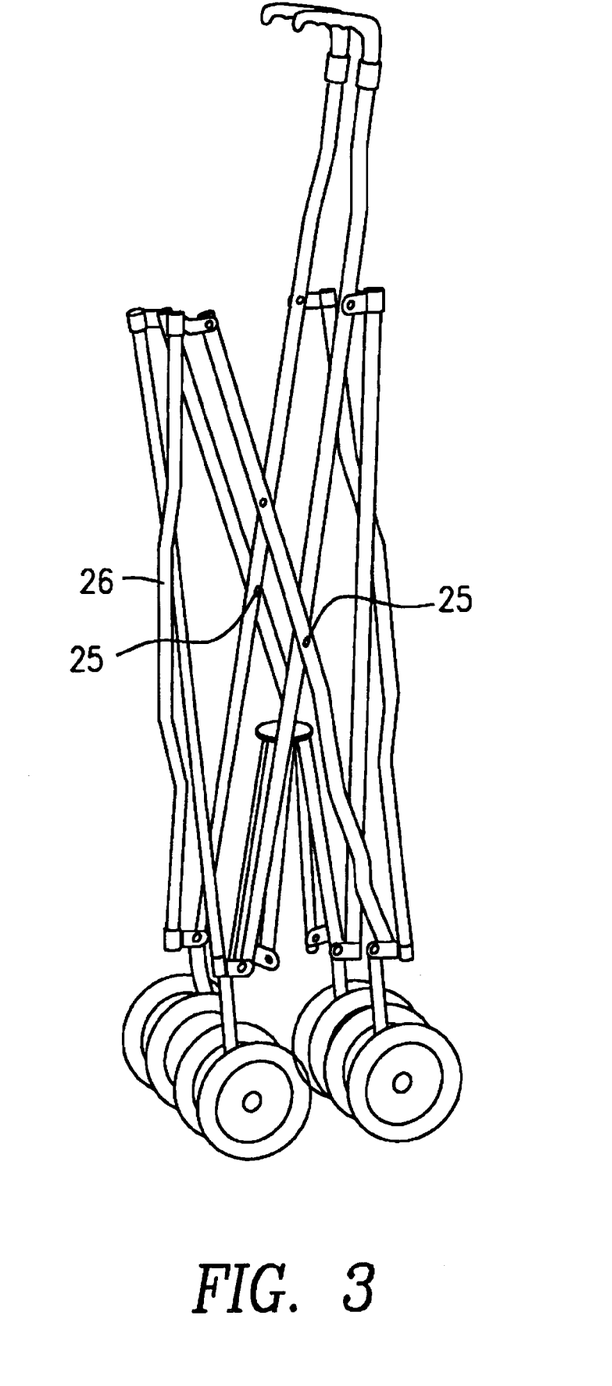
FIG. 3 is a perspective view of a partially collapsed, bagless cart of FIGS. 1 and 2.

Each of the frame bars A and B for a particular frame only touch each other at one spot, substantially centrally along the length of each bar. It is at this substantially centrally located spot that the bars cross, forming an "X" shape. At the intersecting spot, the bars are pivotally joined through use of a standard pin construction, known in the trade. An example of such a pin is shown in FIG. 3 at 25.

As seen best in FIG. 1, the outside bar of each of frames 21, 22, 23 and 24 is notched outwardly in the direction perpendicular to its length. For purposes of this discussion, each of the notches will be referred to and shown in the figures as element 26. The length of the notch in the direction of the length of the particular bar is dictated by the length needed to accommodate the collapsing of cart 10 to allow the two bars of a particular side frame 21, 22, 23 or 24 to get as close to parallel as possible in the completely collapsed condition. This affect is best seen is FIG. 3 in the partially collapsed condition.

Focusing on FIG. 2, it is seen that the upper end of bar 21A is pivotally connected using a sleeve and pin connection 27 to the upper end of bar 22B. The lower end of bar 21A is connected to the lower end of bar 24B, using the same sleeve and pin connector 27. The sleeve and pin connector 27 is preferably a metal sleeve which fits around the top of one of the bars and has a flap 29 extending therefrom, through which a pin 28 is received. Pin 28 is similar to pins 25, and is received through both flap 29 and the top portion of the attached bar: In the case of the connection of 21A and 22B, the top part of bar 22B has the sleeve, while the top part of bar 21A is pivotally attached thereto through use of pin 28 and flap 29, as best seen in FIG. 2. As seen in FIG. 3, all of the connections between the bars of the different frames 21, 22, 23 and 24 use this sleeve and flap and pin construction.

Wrapping up a description of how the bars of the particular frames are connected to the bars of the adjacent frames, we have already said that bar 21A is connected at the top to the top of bar 22B and at the bottom to the bottom of bar 24B. The top of bar 21B is connected to the top of bar 24A, while the bottom of bar 21B is connected to the bottom of bar 22A. The bottom of bar 22B is connected to the bottom of bar 23A. The top of bar 23A is connected to the top of bar 24B. The top of bar 22A is connected to the top of bar 23B, while the bottom of bar 23B is connected to the bottom of bar 24A.

In the fully opened, usable configuration shown in FIG. 1, having the carry bag 70 attached to frame 20, one sees that frames 21, 22, 23 and 24 when connected as described above, form an interior opening which is substantially square in horizontal cross section and substantially rectangular in vertical cross section. In this open, usable configuration, bag 70 is secured over the top corner connections of the front frame 22, while the flap at the top of bag 70 is secured around the outside of handles 30 and 40 through snap mechanisms (not shown). Similar snap mechanisms 75 are used at the bottom corners of bag 70, to secure the bottom of bag 70 to frame 20. Bag 70 is also equipped with handles 78 to allow for ease of carrying bag 70 when it is removed from frame 20. It is anticipated and claimed herein that bag 70 can be either fixed to cart 10 or selectively removable from cart 10.

Figure 4:
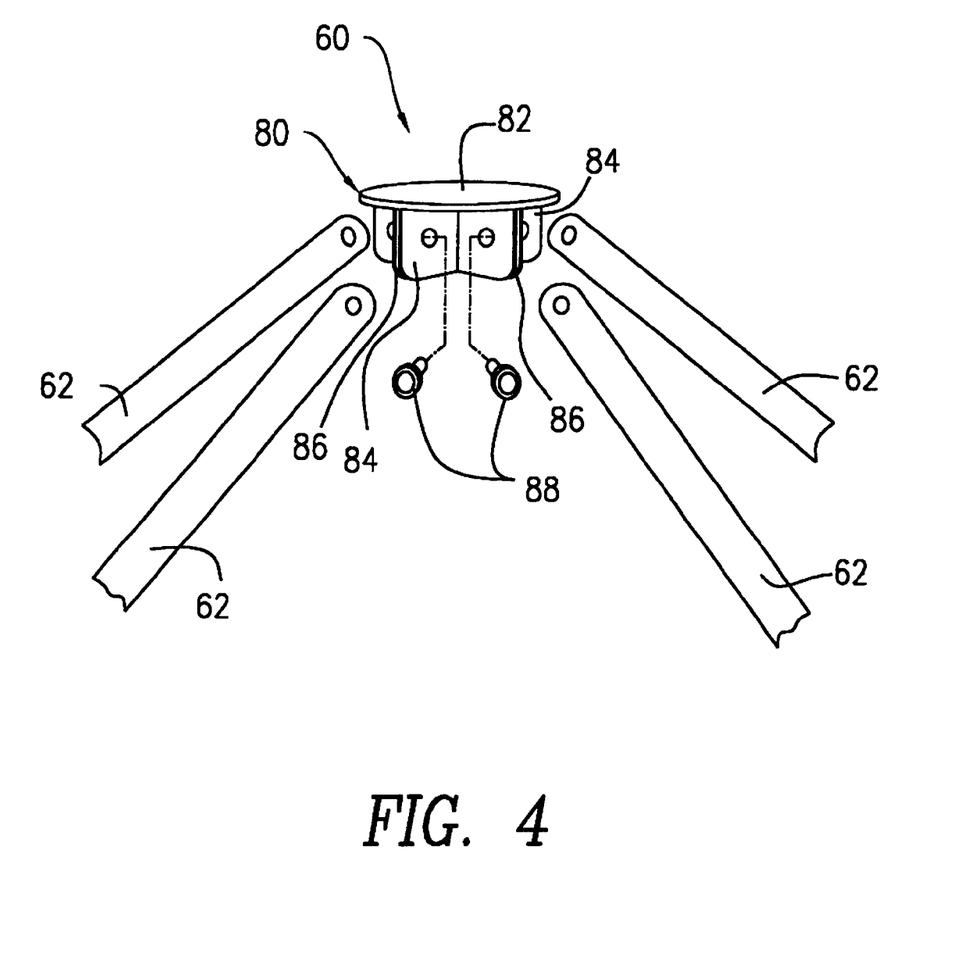
FIG. 4 is an exploded perspective view of the weight bearing assembly and four support bars of the floor array of the cart.
Figure 5:
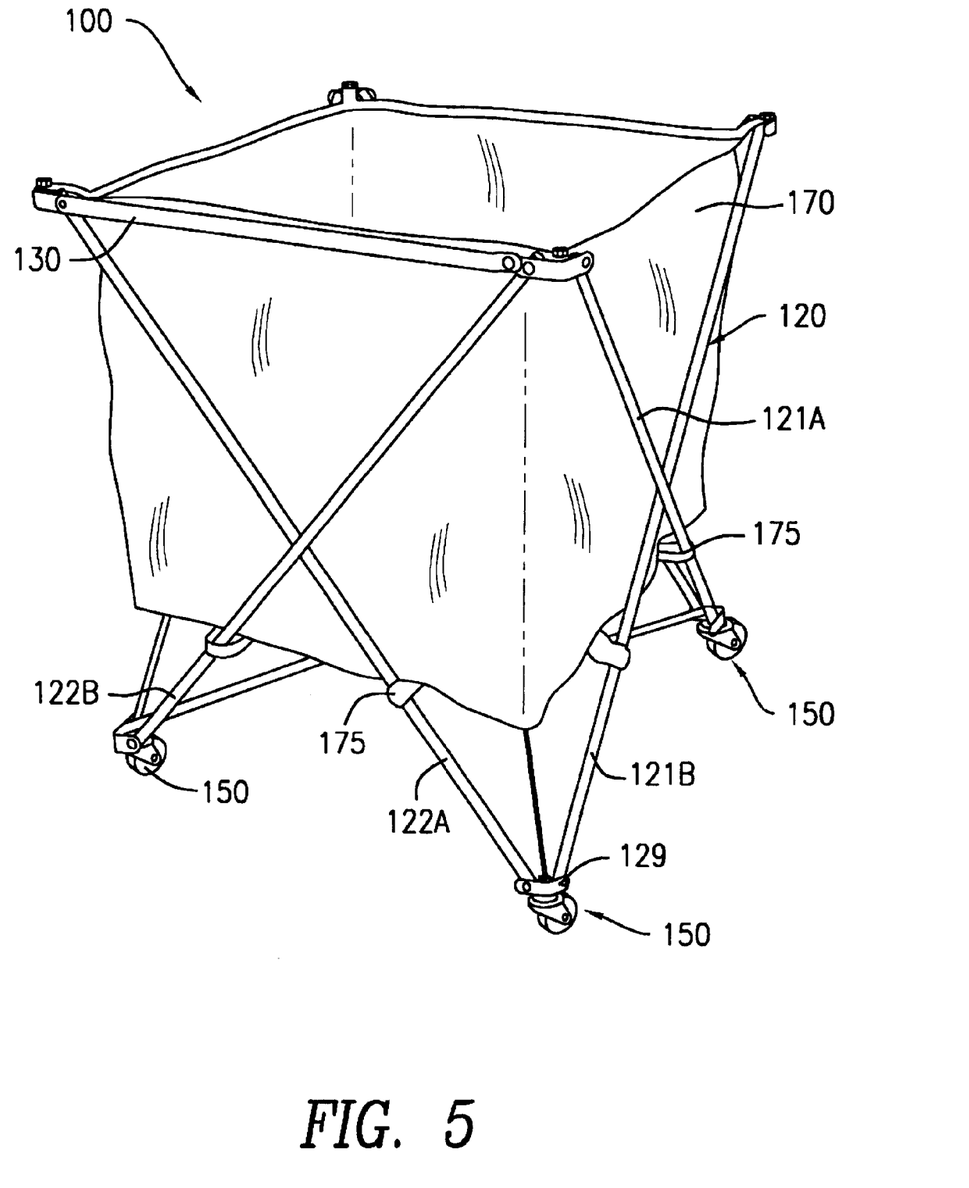
FIG. 5 is a perspective view of a second embodiment of the cart of the subject invention.
Figure 6:
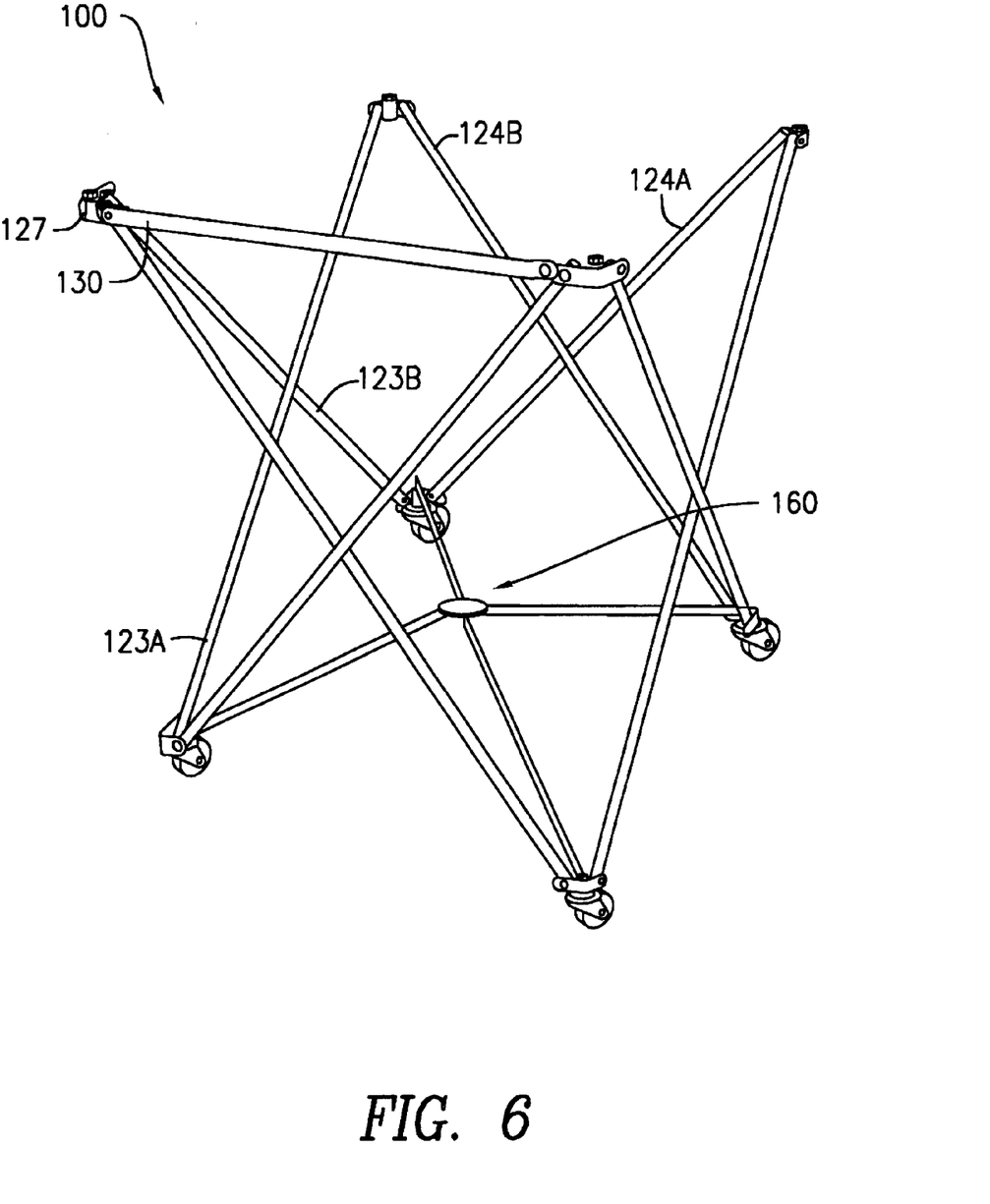
FIG. 6 is a perspective view of the cart of FIG. 5, without the internal carry bag.

Turning now to a discussion of floor array 60, it is best seen in FIG. 4 that floor array 60 consists of a substantially centrally located weight bearing assembly 80, and four support bars 62.

Weight bearing assembly 80 is constructed of a preferably metal plate member 82, and four substantially vertically extending support members 84. In the preferred embodiment, plate 82 is metal, and support members 84 are metal angle irons that are welded to the underside of plate member 82. However, the invention herein anticipates and claims that plates 82 and support members 84 can be formed of other material than metal, as long as the strength requirements of the invention are met. For example, plastic, graphite or other materials can be used for these elements. Further, plate 82 and support members 84 may, instead of being separate members to be secured together, be uniformly molded/constructed, so that no separate "attachment" is required.

Support members 84 are secured to plate 82 in such a way as to create a slot 86 between each pair of adjacent support members, as best seen in FIG. 4. Slot 86 is used to receive therein the ends of support bars 62, and support bars 62 and support members 84 have holes therethrough which cooperate in receipt of bolts 88, which bolts are received in the holes to secure support bar 62 to weight bearing assembly 80. Bolts 88 can either receive nuts (not shown) to secure them, or can be in the form of rivets, or any other type of securing bolt known in the trade.

The other ends of support bars 62 are connected at the four bottom connections of the eight frame bars, as best seen in FIG. 2. These ends of support bars 62 are connected by using similar sleeve, flap and pin connections as earlier discussed.

As seen in the combination of FIGS. 2 and 3, weight bearing assembly 80 moves in a substantially vertical direction, with its lower most vertical point being reached when cart 10 is in the open, usable position, and the upper most vertical position of weight bearing assembly 80 is reached when cart 10 is in its fully collapsed position (not shown). In order to rise and fall in this vertical direction, support bars 62 pivot both in their bolted connection to support members 84, and their pin connection to the bottoms of the connected frame members.

It is the use of plate 82, and the associated strength of this plate, the similar strengths of the support members and the strength of the individual support bars that allow cart 10 of the invention to hold substantial weight therein. For example, a full grown man could stand on weight bearing assembly 80 when cart 10 is in the open, usable position, and cart 10 would be able to hold the individual.

Floor array 60, which uses this aforementioned construction is an improvement over the floor assembly of the cart of the '050 patent (best shown in FIG. 6 of that patent). As seen in FIG. 6 of the prior art '050 assembly, and as discussed at column 5, lines 35–41 of the specification of the '050 patent, only "peripheral portions" of the underside of cap piece 36 come in contact with the "length portions" of the support bars 26 and 28. In addition, the hooked manner of connection of the thin circular cross section support bars 26 and 28 to hub 34 of the prior art assembly, along with the slotted openings 40 shown in FIG. 6 of the prior art assembly, all contribute to a construction which supports some weight, but is not so soundly structured as floor array 60 of the present invention, as can be supported by the assembly of the present invention. The combination of plate 82, support members 84, the rectangular cross section of support bars 62, and the snug fitting slots 86 which receive support bars 62, all combine and contribute to a weight bearing assembly 80 which is far superior to any assembly created in the past for such a device.

Figure 9:
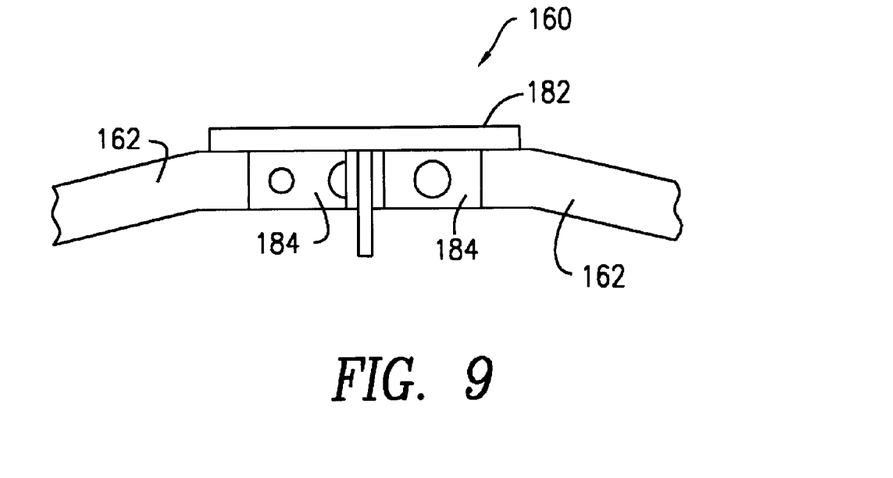
FIG. 9 is a side elevational view of a second embodiment of the weight bearing assembly and support bars of the floor array of the invention.

Finally, as seen in FIG. 9, another slightly altered version of weight bearing assembly 80 entails the use of slightly bent support bars 162, with the bends in bars 162 occurring just past the point where top surfaces of the bars bear upon the underside of plate 182. Such a construction would give floor array 160 a slightly raised center at weight bearing assembly 80, which according to the physics of the construction would allow for some of the downward force exerted on weight bearing assembly 80 to be projected along the length of support bar 62, resulting in an even greater weight bearing capacity.

Figure 7:
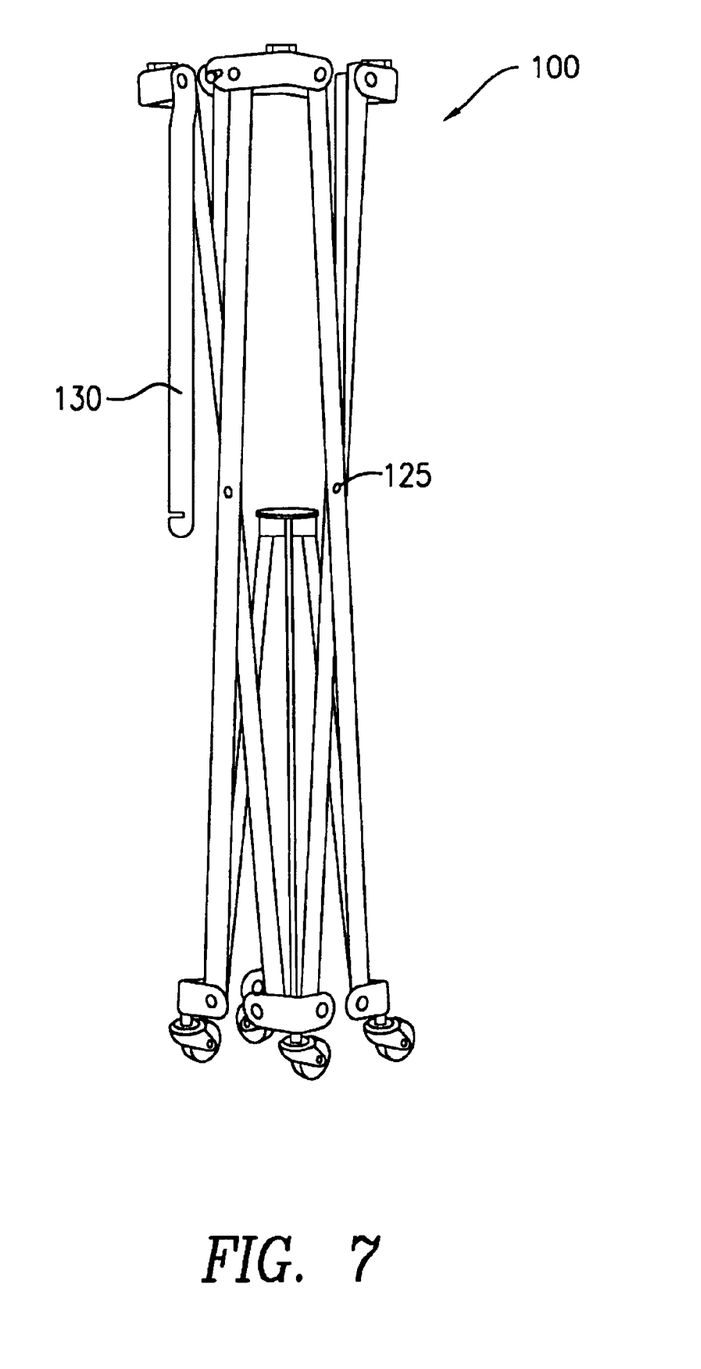
FIG. 7 is a perspective view of the cart of FIGS. 5 and 6 in a partially collapsed condition.
Figure 8:
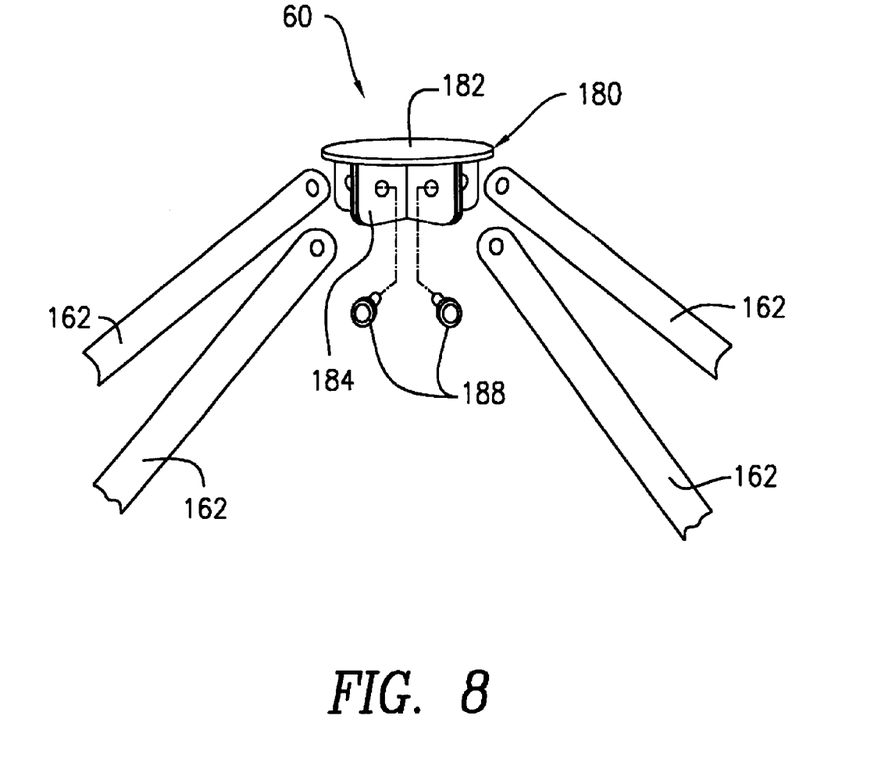
FIG. 8 is an exploded perspective view of the weight bearing assembly and four support bars of the floor array of the cart.

Regarding FIGS. 5–8, the essential construction of cart 10 is attributed also to cart 100. The most significant change between carts 10 and 100 is in the handle assembly. As seen in the FIGS. 1–4, handles 30 and 40 of cart 10 are more similar to those handles normally found on baby strollers, while handle 130 of cart 100 is a substantially horizontal bar which is selectively releasable from its horizontal orientation to hang in a vertical direction, as best seen in FIG. 7. The horizontal, attached, orientation of handle 130 of cart 100 is used when cart 100 is in its fully open, usable condition. Thereafter, to collapse cart 100 into the position partially shown in FIG. 7 handle 130 is disengaged, and is allowed to hang in the substantially vertical orientation shown in FIG. 7.

In both embodiments of the invention, carts 10 and 100, it is anticipated that either two sets of wheels 50/150 or four sets of wheels 50/150, can be used. In the case where only two sets of wheels are used (not shown), the wheels will be situated at the back corners of the cart, below the handle(s).

It is also anticipated and claimed herein that the carts herein described can have shapes other than those shown in the drawings (i.e., 3 sided, 5 sided, etc.).

It will thus be seen that the objects set forth above, among those made apparent from the preceding description, are efficiently attained, and since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention, which, as a matter of language, might be said to fall therebetween.

What is claimed is:

1. A portable, collapisble cart, comprising:
   a selectively collapsible frame having a usable bag when said frame is in an open, usable position and comprising four frame arrays of two frame bars each, said two frame bars of each of said frame arrays intersecting each other at a substantially central location along a length of each of said frame bars;
   at least one handle extending from said selectively collapsible frame;
   a plurality of wheel assemblies extending from and substantially below said selectively collapsible frame; and
   a floor array comprising a plurality of support bars and a weight bearing assembly located substantially centrally of said floor array, said weight bearing assembly comprising a top plate and a plurality of support members extending from a bottom surface of said plate, said plurality of support bars attached to said plurality of support members.

2. A portable, collapsible cart as recited in claim 1, wherein a number of support members of said plurality of support members is equivalent to a number of support bars of said plurality of support bars.

3. A portable, collapsible cart as recited in claim 2, wherein a pair of said number of support members has attached thereto one of said number of support bars at one end thereof through a slot existing between said pair of said number of support members.

4. A portable, collapsible cart as recited in claim 1, wherein said plurality of support members are angle irons.

5. A portable, collapsible cart as recited in claim 4, each of said angle irons having by definition two legs, wherein four of said angle irons are attached to said plate in an orientation to allow for a substantially narrow slot to exist between said legs of said angle irons adjacent to each other.

6. A portable, collapsible cart as recited in claim 5, wherein a first end of each of said plurality of support bars is received within one of said slots.

7. A portable, collapsible cart as recited in claim 6, wherein each of said legs of said angle irons has a hole therethrough, and said first end of each of said support bars has a hole therethrough, all of said holes for receiving therein a securing mechanism allowing each of said support bars to pivot in relation to its attachment to said angle irons.

8. A portable, collapsible cart as recited in claim 1, wherein said cart is in said open, usable position when said weight bearing assembly is in a bottom most vertical orientation.

9. A portable, collapsible cart as recited in claim 8, wherein said cart is in a collapsed, storage position when said weight bearing assembly is in an uppermost vertical orientation.

10. A portable, collapsible cart as recited in claim 9, wherein each of said support bars has a top bearing surface which bears upon a portion of said bottom surface of said plate in a weight supporting manner, when said cart is in said open, usable position.

11. A portable, collapsible cart as recited in claim 10, each of said support bars having a substantially rectangular cross section.

12. A portable, collapsible cart as recited in claim 1, wherein said bag is selectively removably securable to said selectively collapsible frame.

\* \* \* \* \*